United States Patent Office 3,645,998
Patented Feb. 29, 1972

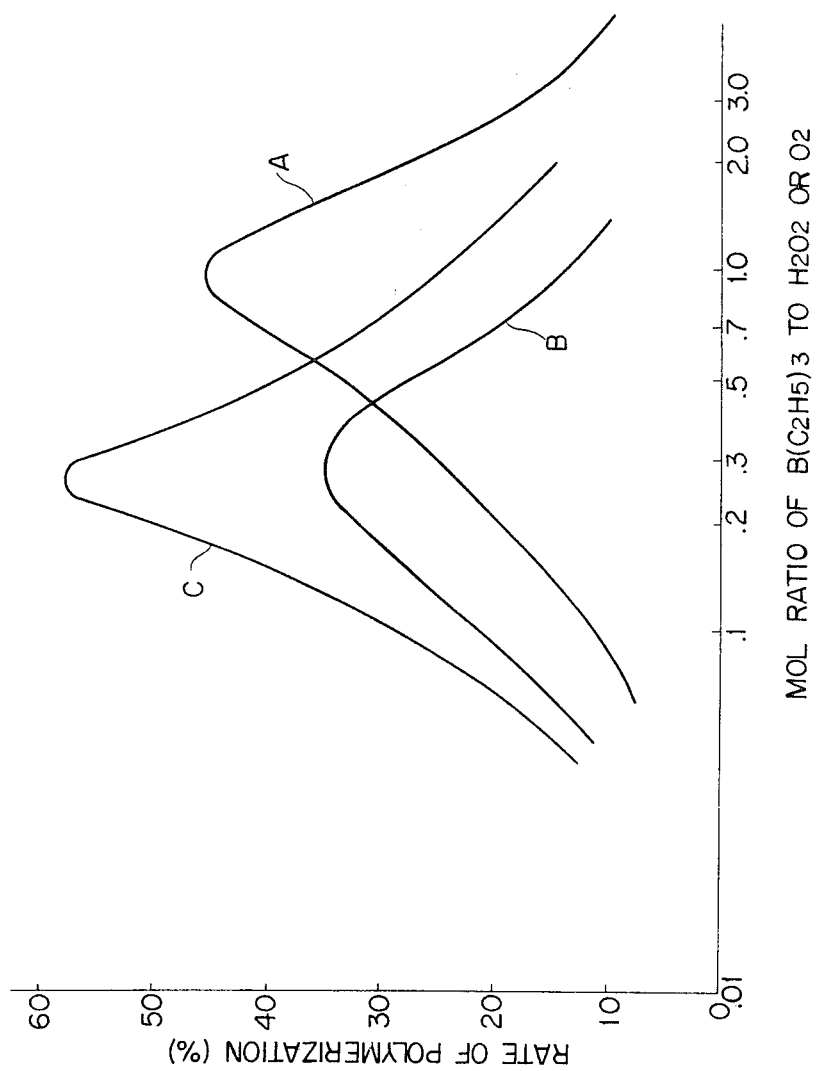

3,645,998
METHOD OF PRODUCING POLYVINYL FLUORIDE IN AN AQUEOUS MEDIUM IN THE PRESENCE OF A CATALYST SYSTEM OF TRI-ALKYL BORON AND HYDROGEN PEROXIDE
Yuichi Iikubo, Takuji Nishida, and Yoshiki Furukawa, Onoda, Japan, assignors to Onoda Cement Company, Limited, Yamaguchi Prefecture, Japan
Filed Apr. 16, 1969, Ser. No. 816,678
Claims priority, application Japan, May 8, 1968, 43/30,256
Int. Cl. C08f 3/22
U.S. Cl. 260—92.1        11 Claims

ABSTRACT OF THE DISCLOSURE

This invention relates to a method of producing polyvinyl fluoride by polymerizing a monomer of vinyl fluoride in an aqueous medium by using a catalyst comprising trialkyl-boron and hydrogen peroxide for initiating the polymerization of said monomer. The polymerization reaction is easily started in the aqueous medium due to the actions of the special catalyst and the characteristics of the resultant polyvinyl fluoride can easily be controlled.

---

This invention relates to a method of producing polyvinyl fluoride by polymerizing a monomer of vinyl fluoride in the presence of water by using trialkyl-boron ($BR_3$, wherein R indicates an alkyl group) and hydrogen peroxide as the initiating agents for polymerization.

Recently polyvinyl fluoride has been widely used for many applications as it has excellent properties including weatherability, chemical resistance, flux cycles, post formability and the like.

It is relatively difficult to polymerize a monomer of vinyl fluoride to produce polyvinyl fluoride and therefore it is necessary to use a rather severe condition or a special initiator for the polymerization of said monomer. Several methods of producing polyvinyl fluoride have been proposed in the art and they can be classified into the following three types of methods.

(1) This method is carried out at high temperature and high pressure by using the conventional organic peroxides as the catalysts.

(2) This method is carried out at relatively low temperature by using the catalysts designated as Ziegler-Natta type catalyst.

(3) This method is carried out by using the catalyst comprising trialkyl-boron and oxygen.

The actions and effects of the catalyst comprising trialkyl-boron and oxygen were reported in considerable detail when method (3) was applied to the polymerization of monomers other than vinyl fluoride and the catalyst was illustrated by the following reaction mechanims.

The trialkyl-boron ($BR_3$) is first oxidized with the oxygen as shown in the following equation because it is an easily oxidizable substance:

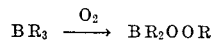

Then, the resultant $BR_2OOR$ produces a radical for initiating the polymerization of monomer by the action of the $BR_3$.

The inventors have studied the methods of producing polyvinyl fluoride by using trialkyl-boron as the catalyst and have found that when the bulk polymerization procedure is used the polymerization reaction of vinyl fluoride proceeds with high speed as in the other polymerization reactions but also that the polymerization reaction of vinyl fluoride does not proceed satisfactorily when suspension and emulsion procedures using water as the reaction medium are employed. Further, it has been found that the rate of reaction of such a polymerization is reduced even if a small amount of water is contained in the reaction medium. For example, this is proved by the method of producing polyvinyl fluoride by polymerizing 8 grams of vinyl fluoride at 30° C. for 2 hours by using the catalyst comprising 0.17 mol percent of $B(C_2H_5)_3$ and oxygen in the mol ratio of 0.3 of the oxygen to the $B(C_2H_5)_3$. The catalyst is referred to as "$BR_3$—$O_2$ type catalyst" hereinafter. The results are given in the following Table 1.

TABLE 1

| The amount of water added to reaction medium (cc.): | Yield of polyvinyl fluoride (percent) |
|---|---|
| 0 | 38.5 |
| 0.025 | 2.0 |
| 0.1 | 2.5 |

Also, it was found that the rate of the polymerization reaction is remarkably reduced by a small amount of water when the $BR_2OOR$—$BR_3$ type catalyst is used for the polymerization of vinyl fluoride as in the $BR_3$—O type catalyst. This is proved, for example, by the method of producing polyvinyl fluoride by polymerizing vinyl fluoride at 30° C. for 2 hours by using the indicated catalysts. The results are given in the following Table 2.

TABLE 2

| Amount of water added to reaction medium (cc.) | $BR_2OOR$ (mol percent) | $BR_3$ (mol percent) | Vinyl fluoride (gram) | Yield of polyvinyl fluoride (wt. percent) |
|---|---|---|---|---|
| 0 | 0.095 | 0.095 | 9.3 | 41.5 |
| 0.05 | 0.097 | 0.090 | 9.4 | 2.3 |

In Table 2, the sign R indicates a $C_2H_5$-radical, that such a peculiar phenomenon occurred in the polymerization reaction was not ever recognized in case of polymerization of monomers other than the monomer of vinyl fluoride and also it was not ever reported in the literature on the polymerization using the trialkyl-boron catalyst. For example, the polymerization of acrylonitrile is slightly affected by the water contained in the reaction medium in comparison with the polymerization of vinyl fluoride as shown in the following Table 3. The polymerization reaction is carried out at 30° C. for 2 hours by using the indicated catalysts.

TABLE 3

| Amount of water added to reaction medium (cc.) | $B(C_2H_5)OOC_2H_5$ (mol percent) | $B(C_2H_5)_3$ (mol percent) | Acrylonitrile (grams) | Yield of polyacrylonitrile (wt. percent) |
|---|---|---|---|---|
| 0 | 0.085 | 0.085 | 10 | 45.5 |
| 0.025 | 0.085 | 0.085 | 10 | 28.0 |
| 0.075 | 0.085 | 0.085 | 10 | 29.5 |

Still further, the Japanese Patent Publication No. 4744 published in the year 1964 discloses that the polymerization reaction of vinyl chloride proceeded with high speed when it was carried out by the suspension procedure using an aqueous reaction medium containing the $BR_3$ type catalyst, together with water or a combination of water and alcohol but the polymerization reaction of vinyl fluoride is remarkably affected by the water contained in the reaction medium, and the reaction speed is reduced to the range of 10 to 5% of the reaction speed achieved when the vinyl fluoride is polymerized in the absence of water under the same conditions.

It is desirable to carry out the polymerization reaction at constant conditions, and particularly it is an important factor to remove polymerization heat evolved when the polymer is produced in a large commercial scale. And, it it well-known that suspension polymerization and emulsion using water or an aqueous reaction medium are contemplated as the reaction heat is easily removed. The water, however, reduces the reaction speed and thus it is obvious that the water reduces the commercial value of the method of producing polyvinyl fluoride using trialkyl-boron as the initiating agent for the polymerization of vinyl fluoride.

In order to remove the above defects, the inventors have searched for a trialkyl-boron type catalyst which is not adversely affected by water and have found that a hydrogen peroxide-trialkyl boron type catalyst can be used as an initiating agent for the polymerization of vinyl fluoride without being adversely affected by water and the polymerization reaction can be carried out with high speed.

This invention has been developed on the basis of the above discovery, and the actions and effects achieved by this invention using an hydrogen peroxide-trialkyl boron type catalyst for polymerizing vinyl fluoride are illustrated hereinafter and distinguished from the actions and effects achieved by using the conventional alkyl boron-oxygen type catalysts.

If it is assumed that the hydrogen peroxide-trialkyl boron type catalyst acts on the basis of the reaction mechanism including the oxidation reaction of the trialkyl boron ($BR_3$) with the hydrogen peroxide to produce $BR_2OOR$ and the decomposition reaction of the $BR_2OOR$ with the trialkyl boron ($BR_3$) as in the reaction mechanism in which the alkyl boron-oxygen type catalyst is considered, it is reasonable to assume that the phenomenon of the reduction of the reaction speed of the polymerization of vinyl fluoride would result from the action of water. The inventors, however, have not found such phenomenon when 8.5 grams of vinyl fluoride is polymerized at 30° C. for 2 hours by using 0.1 mol percent of $$B(C_2H_5)_3$$

and 0.5 mol ratio of the $B(C_2H_5)_3$ to the hydrogen peroxide in the presence of water. The results are given in the following Table 4.

TABLE 4

| The amount of water added to reaction medium (cc.): | Yield of polyvinyl fluoride |
|---|---|
| 0.44 | 14.0 |
| 0.88 | 15.8 |
| 1.76 | 15.1 |

Further, it is obvious from the accompanying drawing that the hydrogen peroxide-trialkyl boron type catalyst used in this invention differs from the trialkyl boron-oxygen type catalyst in its reaction mechanism. The accompanying drawing shows the relationship between the rate of polymerization and the mol ratio of $BR_3$ to $H_2O_2$ or $BR_3$ to $O_2$ when 9 grams of vinyl fluoride is polymerized at 30° C. by using the $0.744\times10^{-3}$ mol of $H_2O$ or $O_2$, together with the trialkyl boron. In the drawing, the curve A shows the results when the $B(C_2H_5)_3$—$O_2$ type catalyst is used for 2 hours in the absence of water and the curve B shows the results when the $B(C_2H_5)_3$—$H_2O_2$ type catalyst is used for 2 hours in the presence of 1.4 cc. of water. Also, the curve C shows the results when the $B(C_2H_5)_3$—$H_2O_2$ type catalyst is used for 8 hours in the presence of 1.4 cc. of water. As shown in the drawing, all the curves have maximum values and the maximum value of curve A is the point indicated by the mol ratio of about 1 which is distinguishable from about 0.2 to 0.5 of the mol ratio indicating the maximum values of the curves B and C.

The trialkyl boron used in this invention includes triethyl-boron, tripropyl-boron, triisopropyl-boron, tributyl-boron and triisobutyl-boron or the like. In general, the mol ratio of $BR_3$ to $H_2O_2$ is varied within the range of from about 0.05 to 0.6 for producing highly polymerized polyvinyl fluoride with the high efficiency, and it is desirable to use the mol ratio of about 0.2 to 0.5. When the mol ratio of $BR_3$ to $H_2O_2$ is less than the above range, the polymerization slows down, and when the mol ratio is larger than the above range, the resultant polymer is reduced in its molecular weight.

In general, the hydrogen peroxide is use in an amount of 0.001 to 6 mol percent per mol of the monomer of vinyl fluoride but the amount of the hydrogen peroxide can be varied depending on the reaction temperatures and the molecular weight required. It is preferable to use a reaction temperature ranging from $-10°$ C. to $+50°$ C. When the reaction temperature is above 50° C., the reaction proceeds with high speed at the initial step but the speed of reaction is reduced after a short period of time and thus a yield of polymer (percent) is remarkably reduced. The reaction pressure may be the vapour pressure of vinyl fluoride but it can be increased by introducing argon, helium, nitrogen or water into the reaction zone in order to increase the reaction speed. It is preferable to replace the oxygen contained in the reaction vessel with nitrogen because the oxygen reacts with the trialkyl boron to produce an oxide or a peroxide of the trialkyl boron and the oxide or the peroxide results in inhibiting the polymerization reaction or the transfer-chain reaction or in deviating the optimum ratio of $BR_3$ to $H_2O_2$ when water is used according to the method of this invention.

As stated hereinbefore, the polymerization of vinyl fluoride is carried out in the present of water or in an aqueous medium containing water and the conventional additives used for the conventional polymerization reactions. The additives include solvents and dispersing agents. Some examples of the solvents are methyl alcohol, ethyl alcohol, propyl alcohol, tertiary butyl alcohol, 1,1-difluoroethane, difluoromethane, difluorochloromethane, trifluoromethane, chlorotrifluoromethane, carbon dioxide, propane, butane, pentane, hexane. Some examples of the dispersing agents are polyvinyl alcohol, gelatine, polyacrylic acid, calcium carbonate, magnesium carbonate, aluminium hydroxide, and silicon oxide hydrate. The solvents act to controlling the molecular weight of polyvinyl fluoride. Such additives affect the polymerization reaction but the polymerization speed is not so adversely affected when the additives are the electron-doner type compounds as compared with the trialkyl boron-oxygen type catalyst. For example, when alcohols are used as the additives, the polymerization speed in practicing this invention is not substantially affected but the molecular weight of polyvinyl fluoride is widely varied due to the variation of the ratio of water to alcohol. On the contrary, it is not possible to use water in the reaction medium when a trialkyl boron-oxygen type catalyst is used for the polymerization of vinyl fluoride and also a drop in the polymerization speed as the amount of alcohol increases is unavoidable when alcohol is used alone as the additive for controlling the molecular weight of polyvinyl fluoride.

The reaction vessel used in this invention can be made of the conventional materials such as glass, stainless steel, aluminium, iron and steel. They do not adversely act on vinyl fluoride and polyvinyl fluoride, and also they are stable against trialkyl boron. Aluminum is not an anticorrosive material with respect to hydrogen peroxide but it can be used in the practice of this invention using the hydrogen peroxide at a low concentration.

In carrying out suspension polymerization by using the suspension reaction medium in accordance with this invention, the medium is separated into two layers, in which one is the layer containing trialkyl boron dissolved in vinyl fluoride, and the other is the layer containing hydrogen peroxide dissolved in water. The polymerization reaction is started by contacting the former layer with the latter layer and therefore suspension polymerization is conducted as illustrated hereinafter and in the following examples.

The reaction ingredients are charged into a reaction vessel after they were condensed by cooling at low temperatures, and then the reaction vessel is shaken in a thermostat, or hydrogen peroxide is previously dissolved in water in the reaction vessel and then the reaction vessel is charged with vinyl fluoride dissolved in the predetermined amount of trialkyl boron with agitation or water, hydrogen peroxide and a monomer of vinyl fluoride are charged into the reaction vessel with agitation until the reaction ingredients reach a constant temperature, and then the reaction vessel is charged with trialkyl boron. The reaction system may be freed of oxygen by a cycle of refrigeration, application of a vacuum and melting or the system may be flushed with an inert gas. The polymerization may be carried out under the partial pressure of vinyl chloride or under a higher pressure. For example, pressure in the reactor can be developed by use of sufficient water or by the introduction of an inert gas such as argon, helium or nitrogen to pressurize the system.

From the foregoing or examples as illustrated hereinafter, it is apparent to those skilled in the art that this invention has the advantageous merits that the polymerization reaction occurs rapidly as compared with the method using a trialkyl boron-oxygen type catalyst even if water is used, the reaction heat evolved can easily be removed by using water and the characteristics of polyvinyl fluoride can be controlled, over a wide range and therefore this invention is commercially useful.

Now, this invention is illustrated by the following examples.

EXAMPLE 1

0.85 cc. of an aqueous solution of hydrogen peroxide which contains 0.825 gram of water and 0.025 gram of hydrogen peroxide was charged into a 18 cc. glass tube and then it was jointed to a vacuum system for maintaining the tube at the reduced pressure of $10^{-2}$ mm. Hg, and oxygen contained in the reaction system was removed by repeating a cycle three times, said cycle consisting of the steps of refrigerating, degasifying under vacuum and melting, and then 9 grams of degasified vinyl fluoride, and 0.036 gram of degasified triethyl boron were charged into the glass tube placed in a liquid nitrogen-containing vessel from the storage tanks containing said vinyl fluoride and said triethyl boron respectively, and then the glass tube was sealed off. The mol ratio of triethyl boron to hydrogen peroxide is 0.5. The sealed tube was placed horizontally on a shaking thermostat maintained at a temperature at 30° C.±0.5° C. and the shaking thermostat was shaken at the rate of 51 times per minute. The content in the glass tube became turbid after the thermostat was shaken for 2 minutes and the formation of polymer was recognized. After the thermostat was shaken for 2 hours, the glass tube was removed from the thermostat and the content in the glass tube was solidified by cooling said glass tube in a bath containing Dry Ice and methanol and then in liquidized nitrogen. Then, the content was discharged into an ammonia-methanol solution for stopping the progress of polymerization reaction. The reaction product was filtered and dried under reduced pressure. The dried product weighed 3.52 grams with the yield of 39.1%. The product was tested: the melting point was 218° C. and the intrinsic viscosity was 0.88. The intrinsic viscosity was measured at 120° C. by dissolving the product in N,N-dimethylformamide. Also the product was dissolved in N,N-dimethylformamide to form a solution and a film was formed from the solution and then the film was tested for infra-red absorption spectra. These tests proved that the product is polyvinyl fluoride.

COMPARATIVE EXAMPLE

In this example, a trialkyl boron-oxygen type catalyst was used in the presence or the absence of water. By using a vacuum system as in Example 1, triethyl boron and vinyl fluoride were charged into a 19 cc. glass tube and then oxygen was charged into said glass tube and then said glass tube was sealed off. When water was used, the glass tube was previously charged with water and then degassified in the same manner as in Example 1. The reaction was conducted in the same conditions as in Example 1. The results are given in the following table.

| $B(C_2H_5)_3$ (gram) | $O_2$ (cc.) | Ratio of $B(C_2H_5)_3/O_2$ | Vinyl fluoride (gram) | Water (gram) | Yield of polyvinyl fluoride (percent) |
|---|---|---|---|---|---|
| 0.020 | 1.47 | 3.1 | 9.0 | 0 | 37.8 |
| 0.022 | 1.62 | 3.0 | 9.0 | 0.29 | 2.6 |

EXAMPLE 2

This example was repeated by using the same apparatus and the same procedures as in Example 1 with the exception that 0.44 cc. of an aqueous solution of hydrogen peroxide which contains 0.42 gram of water and 0.0125 gram of hydrogen peroxide was charged into a 18 cc. glass tube and then 1.32 grams of water, 8.6 grams of vinyl fluoride and 0.018 of triethyl boron were charged into said glass tube, and then said tube was sealed off. The mol ratio of triethyl boron to hydrogen peroxide is 0.5. The sealed tube was placed horizontally on a shaking thermostat maintained at a temperature of 30° C.±0.5° C. and the ingredients contained in said tube were reacted for 8 hours. The reaction product was tested in the same manner as in Example 1 and proved that it is polyvinyl fluoride. The product weighed 5.47 grams with the yield of 63.6%, and it has the melting point of 227° C. and intrinsic viscosity of 1.50 when measured in the dimethylformamide solution at 120° C.

EXAMPLE 3

This example was repeated by using the same apparatus and the same procedures as in Example 1 with the exception that 0.85 cc. of an aqueous solution of hydrogen peroxide which contains 0.83 gram of water and 0.025 gram of hydrogen peroxide, 8.6 grams of vinyl fluoride and 0.015 gram of triethyl boron were charged into the 19 cc. glass tube and then said tube was sealed off. The mol ratio of triethyl boron to hydrogen peroxide was 0.2. The polymerization reaction was continued for 8 hours. The resultant polyvinyl fluoride weighed 4.52 grams with the yield of 52.6%, and it has a melting point of 227° C. and intrinsic viscosity of 2.8.

EXAMPLE 4

0.18 gram of triethyl boron and 6.3 grams of vinyl fluoride were charged into a glass vessel which was provided with a cock resistant to pressure in the same manner as in Example 1. Also, 18 grams of ion-exchanged water and 0.85 cc. of an aqueous solution of hydrogen peroxide which contained 0.83 gram of water and 0.0125 gram of hydrogen peroxide were charged into a 30 cc. autoclave which was provided with a valve resistant to pressure, and made of stainless steel (SUS 27) and then the air contained in the autoclave was purged with nitrogen gas under pressure of 100 kg./cm.² and reduced pressure by applying such increased and reduced pressure three times and then the content in said autoclave was cooled. Then the content of the glass vessel was charged into the autoclave in the liquid state through the connecting pipe under reduced pressure and then the valve was closed. The autoclave was placed horizontally on a shaking thermostat maintained at 30° C. and the polymerization reaction was continued for 8 hours. Unreacted vinyl fluoride was removed from the autoclave and the product was mixed with methanol, filtered and dried. The dried product (polyvinyl fluoride) weighed 2.1 grams with the yield of 33%, and it had intrinsic viscosity of 3.3.

EXAMPLE 5

This example was repeated by using the same apparatus and the same procedures as in Example 4 with the exception that 16.5 cc. of water, 1.5 cc. of methanol, 0.85 cc. of an aqueous solution of hydrogen peroxide, which contained 0.0125 gram of hydrogen peroxide and 0.83 gram of water, 6.0 grams of vinyl fluoride and 0.018 gram of triethyl boron were charged into a 30 cc. reaction vessel made of stainless steel and the polymerization reaction was continued for 8 hours at 30° C. under shaking for obtaining 2.6 grams of polyvinyl fluoride with the yield of 43.4%. The resultant polyvinyl fluoride had intrinsic viscosity of 1.8.

EXAMPLE 6

This example was repeated by using the same apparatus and the same procedures as in Example 1 with the exception that 0.85 cc. of an aqueous solution of hydrogen peroxide, which contained 0.83 gram of water and 0.0125 gram of hydrogen peroxide, 9.7 grams of vinyl fluoride and 0.018 gram of triethyl boron were charged into a 64 cc. glass tube and then said glass tube was sealed off. The polymerization reaction was continued for 8 hours at 30° C. under shaking to obtain 4.2 grams of polyvinyl fluoride with the yield of 43.3%. The resultant polyvinyl fluoride had the intrinsic viscosity of 1.0.

EXAMPLE 7

One liter of ion-exchanged water, 0.2 liter of methanol and 16.7 grams of a 31.2% aqueous solution of hydrogen peroxide were charged into a 5 liter autoclave and the air contained in said autoclave was purged with a nitrogen gas under pressure of 100 kg./cm.$^2$ and reduced pressure by applying such increased and reduced pressure three times and then the content in said autoclave was cooled. Then, 1.5 kg. of a vinyl fluoride gas were charged into the autoclave by condensing said gas derived from a bomb. Also, the air in another small autoclave was degassified by using a vacuum system and was charged with triethyl boron under reduced pressure and then said autoclave was pressurized by nitrogen gas to 100 kg./cm.$^2$. Then the former autoclave was connected with the latter autoclave through a connecting stainless steel pipe having a 1 mm. in inner-diameter, and the triethyl boron was charged into the former autoclave in the liquid state and in the amount of 5.0 grams. The former autoclave (5 liters autoclave) was placed on a shaking thermostat and it was shaken at the rate of 52 times per minute at 29° C. for 4 hours. The maximum gauge pressure of the autoclave was observed at 43 kg./cm.$^2$ during reaction but the pressure was reduced to 31 kg./cm.$^2$ after the reaction was stopped. 700 grams of unreacted vinyl fluoride were recovered. The resultant polymer was pure white particles having the size of below 1 mm. The polymer was washed with water and then with methanol, and then filtered and dried under reduced pressure. The product weight 735 grams with the yield of 49%, and it had the intrinsic viscosity of 0.66.

EXAMPLE 8

3 liters of distilled water, 0.5 liter of methanol and 16.7 grams of a 31.2 wt. percent aqueous solution of hydrogen peroxide were charged into a 5 liters autoclave which is provided with a stirrer and the lid of said autoclave was closed and then the air contained in said autoclave was purged with nitrogen in the same manner as in Example 7. Then the autoclave was charged with a mixture of 5.5 grams of triethyl boron and 950 grams of vinyl fluoride, and then the autoclave was agitated at the rate of 500 to 600 r.p.m. in a thermostat maintained at a temperature of 30° C.±0.5° C. The polymerization reaction was conducted for 2 hours at the maximum gauge pressure of 37 kg./cm.$^2$. 560 grams of unreacted vinyl fluoride were recovered, and 380 grams of polyvinyl fluoride were obtained in the state of particles having the size of below 44μ. The yield was 40%.

EXAMPLE 9

The autoclave used in Example 8 was charged with 3 liters of distilled water, 0.5 liter of methanol and 16.7 grams of a 31.2 wt. percent aqueous solution of hydrogen peroxide, and the lid of said autoclave was closed and then the air contained in said autoclave was purged with nitrogen in the same manner as in Example 7. Then the autoclave was charged with 960 grams of vinyl fluoride and then it was agitated at the rate of 500 to 600 r.p.m. in a thermostat maintained at a temperature of 30° C.±0.5° C. After the temperature of the autoclave was maintained at the constant temperature, 5.5 grams of triethyl boron was charged into said autoclave in the same manner as in Example 7 and then the polymerization reaction was conducted for 2 hours. 680 grams of unreacted vinyl fluoride were recovered and 250 grams of polyvinyl fluoride were obtained with the yield of 26%.

What we claim is:

1. A method of producing polyvinyl fluoride which comprises polymerizing a monomer of vinyl fluoride in an aqueous medium in the substantial absence of oxygen and in the presence of a catalyst comprising trialkyl boron and hydrogen peroxide, the mol ratio of trialkyl boron to hydrogen peroxide being about 0.05 to 0.6 and hydrogen peroxide being present in an amount of about 0.001 to 6 mol percent per mol of vinyl fluoride, to initiate the polymerization of said monomer, said trialkyl boron being selected from at least one member of the group consisting of triethyl boron, tripropyl boron, triisopropyl boron, tributyl boron and triisobutyl boron.

2. The method of producing polyvinyl fluoride according to claim 1, wherein the water contains a dispersing agent selected from the group consisting of gelatine, polyvinyl alcohol, polyacrylic acid, calcium carbonate, magnesium carbonate, aluminium hydroxide and silicon dioxide.

3. The method of producing polyvinyl fluoride according to claim 1, wherein the polymerization temperature is within the range of −10° C. to +50° C.

4. A method according to claim 1 wherein the ratio by weight of water to hydrogen peroxide is in the range of about 33 to 1500.

5. A method according to claim 1 wherein the ratio by weight of water to vinyl fluoride is in the range of about 0.085 to 3.2.

6. A method according to claim 1 wherein the mol ratio of trialkyl boron to hydrogen peroxide is about 0.2 to 0.5.

7. A method of producing polyvinyl fluoride according to claim 1 in which said aqueous medium contains an organic solvent.

8. A method of producing polyvinyl fluoride according to claim 1 in which said aqueous medium contains a dispersing agent.

9. A method of producing polyvinyl fluoride according to claim 1 in which said aqueous medium contains a dispersing agent and an organic solvent.

10. The method of producing polyvinyl fluoride according to claim 1 wherein the water contains a solvent selected from the group consisting of methyl alcohol, ethyl alcohol, propyl alcohol, tertiary butyl alcohol, pentane and hexane.

11. A method of producing polyvinyl fluoride according to claim 1 in which the polymerization reaction is carried out in the presence of an inert gas selected from the group consisting of argon, helium and nitrogen.

References Cited

UNITED STATES PATENTS

| | | | |
|---|---|---|---|
| 3,025,284 | 3/1962 | George et al. | 260—92.8 |
| 3,041,324 | 6/1962 | De Coene et al. | 260—92.1 |
| 3,413,274 | 11/1968 | Watanabe et al. | 260—92.1 |

HARRY WONG, Jr., Primary Examiner

U.S. Cl. X.R.

260—32.6, 88.7, 92.8